United States Patent
Yuen

(10) Patent No.: US 12,042,754 B2
(45) Date of Patent: Jul. 23, 2024

(54) AIR PURIFICATION SYSTEM AND INTERNET OF THINGS ARTIFICIAL INTELLIGENCE CONTROL APPARATUS

(71) Applicant: Pak Leung Yuen, Hong Kong (HK)

(72) Inventor: Pak Leung Yuen, Hong Kong (HK)

(*) Notice: Subject to any disclaimer, the term of this patent is extended or adjusted under 35 U.S.C. 154(b) by 461 days.

(21) Appl. No.: 17/376,923

(22) Filed: Jul. 15, 2021

(65) Prior Publication Data
US 2021/0339180 A1    Nov. 4, 2021

Related U.S. Application Data

(63) Continuation of application No. PCT/CN2019/115746, filed on Nov. 5, 2019.

(51) Int. Cl.
*B01D 46/00* (2022.01)
*B01D 46/42* (2006.01)
(Continued)

(52) U.S. Cl.
CPC ..... *B01D 46/0032* (2013.01); *B01D 46/0004* (2013.01); *B01D 46/4245* (2013.01);
(Continued)

(58) Field of Classification Search
None
See application file for complete search history.

(56) References Cited

U.S. PATENT DOCUMENTS 3,759,017 A * 9/1973 Young ............... B01D 46/00
 55/481
2015/0290657 A1   10/2015 Wright et al.
(Continued)

FOREIGN PATENT DOCUMENTS

CN    204315202 U    5/2015
CN    104776514 A    7/2015
(Continued)

OTHER PUBLICATIONS

English language machine translation for WO 2011050626 A1. Retrieved from translationportal.epo.org on Dec. 4, 2023. (Year: 2023).*

(Continued)

*Primary Examiner* — Jason M Greene

(57) ABSTRACT

Embodiments of the present application relate to the field of air purification devices, and disclose an air purification system and an Internet of things artificial intelligence control device, applied to both sides of an outdoor street and an associated space, comprising: a housing, an electrostatic dust removal air purifier, a controller, and a fan; The electrostatic dust removal air purifier, the controller and the fan are all disposed in the said housing; The front side of the housing is configured with an air inlet and an air outlet, herein the air inlet is for transmitting outdoor polluted air, and the air outlet is for transmitting purified air; The electrostatic dust removal air purifier and the fan are both connected to the said controller; The controller controls the fan to transmit outdoor air to the housing through the air inlet, and controls the electrostatic dust removal air purifier to purify the said outdoor air, after the air purification is completed, the purified air is discharged by the fan through the air outlet, so that the purification of the outdoor air is realized, to solve the technical problem due to the poor air circulation of the street canyons, the difficulty in diffusing pollutants, and the inability to reduce the pollution on both sides of the street.

6 Claims, 2 Drawing Sheets

(51) Int. Cl.
  *B01D 46/62* (2022.01)
  *F04D 27/00* (2006.01)
(52) U.S. Cl.
  CPC ......... *B01D 46/429* (2013.01); *B01D 46/645* (2022.01); *F04D 27/004* (2013.01); *B01D 2273/30* (2013.01); *B01D 2279/40* (2013.01)

(56) References Cited

U.S. PATENT DOCUMENTS

2019/0001249 A1* 1/2019 Hong .................... F24F 8/80
2020/0298168 A1* 9/2020 Lee ..................... B01D 46/46

FOREIGN PATENT DOCUMENTS

| CN | 204786778 U | 11/2015 | | |
|----|-------------|---------|---|---|
| CN | 207614562 U | 7/2018 | | |
| CN | 108386915 A | 8/2018 | | |
| CN | 108826528 A | 11/2018 | | |
| JP | 2001104746 A | 4/2001 | | |
| KR | 1020170052743 | * | 5/2017 | ............. B01D 46/00 |
| WO | WO 2011050626 A1 | * | 5/2011 | ............. B01D 46/00 |

OTHER PUBLICATIONS

English language machine translation for KR 1020170052743. Retrieved from translationportal.epo.org on Dec. 6, 2023. (Year: 2023).*

* cited by examiner

AIR PURIFICATION SYSTEM AND INTERNET OF THINGS ARTIFICIAL INTELLIGENCE CONTROL APPARATUS

TECHNICAL FIELD

The present application relates to the technical field of air purification devices, and more particularly, to an air purification system and an Internet of things artificial intelligence control device.

BACKGROUND

With the rapid development of industrialization, the science and technology of automotive industry in particular has not been free from the dependence on fossil energy, the types of pollutants in the air are increasing, the particle size of solid pollutants is becoming smaller and smaller, and the threat to human breathing health is becoming more and more serious. With the development of science and technology, there are more and more threats to humans, and the ever-emerging new pathogens are inhaled along with the dirty air. While material life continues to be satisfied, people have increased their attention to their health. In order to reduce the harm of the outside air to the human body, people generally attempt to reduce the damage of dust on both sides of the street, in particular the fine particles represented by PM2.5, through the gauze mask and the dust mask.

However, due to the rise of high buildings in the city, "street canyons" are formed in these high-rise buildings, so that the PM2.5 is floated into the "street canyons". Due to the poor air circulation of the street canyons, the difficulty in diffusing pollutants, and the inability to reduce the pollution on both sides of the street, it is inevitable that all people who pass through or work in the street canyons will be exposed to the PM2.5. Therefore, it is necessary to provide a new technical solution to solve the above-described technical problems.

SUMMARY OF THE UTILITY MODEL

A technical problem to be solved by the embodiments of the present application is to provide an air purification system and an Internet of things artificial intelligent control device, which aim to solve the technical problem that the pollutants on both sides of an outdoor street are unable to be reduced.

To solve the above technical problem, one technical solution implemented in the embodiments of the present application is as follows:

In a first aspect, an embodiment of the present application provides an air purification system applied to both sides of an outdoor street and an associated space, comprising: a housing, an electrostatic dust removal air purifier, a controller, and a fan; The said electrostatic dust removal air purifier, the controller and the fan are all disposed in the said housing; The front side of the said housing is configured with an air inlet and an air outlet, herein the said air inlet is for transmitting outdoor polluted air, and the said air outlet is for transmitting purified air; The said electrostatic dust removal air purifier and the said fan are both connected to the said controller; The said controller controls the fan to transmit outdoor air to the housing through the air inlet, and controls the electrostatic dust removal air purifier to purify the outdoor air. After the air purification is completed, the purified air is discharged by the fan through the air outlet.

Preferably, the said housing is configured with a front filter screen, wherein the said front filter screen is disposed at the said air inlet for filtering the outdoor air.

Preferably, the said housing is further configured with a front air filter, wherein the said front air filter is disposed adjacent to the said air inlet and connected to the said controller for pretreating the outdoor air delivered from the said air inlet.

Preferably, the top end of the said housing is further configured with an Internet of things artificial intelligence control device for detecting an air pollution concentration distribution in a nearby space and transmitting a control communication signal, herein the said controller is communicatively connected to the said Internet of things artificial intelligence control device, the said air outlet is configured with a rotary nozzle, herein the said rotary nozzle is connected to the said controller, and when the said controller receives the control communication signal, the controller controls and directs the operation of the said rotary nozzle to purify polluted air in the said space.

Preferably, the said air inlet and the said air outlet are configured on the same side of the housing.

Preferably, the same side of the said housing as the said air inlet is configured with a mounting port, herein the said mounting port is configured with a dust collecting tray, wherein the said dust collecting tray is disposed at the lower end of the said electrostatic dust removal air purifier, for collecting the dust generated when the said electrostatic dust removal air purifier purifies the air.

Preferably, the said air purification system further comprises: a power supply connected to the said controller, the fan and the electrostatic dust removal air purifier for supplying power to the said controller, the fan and the electrostatic dust removal air purifier.

Preferably, the said air purification system further comprises: a solar photovoltaic panel disposed at the top of the said housing, herein the said solar photovoltaic panel is connected to the said power supply and operable to supply power to the said power supply.

Preferably, the side of the said housing facing away from the said air inlet is configured with a first sealing door, and the side of the said housing adjacent to the said first sealing door is configured with a second sealing door, herein the said first sealing door and the said second sealing door are used for the maintenance of the air purification system and are able to prevent rainwater from entering the said air purification device when closed.

In a second aspect, an embodiment of the present application provides an Internet of things artificial intelligence control device, applied to the said air purification system as described above, herein the said Internet of things artificial intelligence control device is communicatively connected to the said controller for transmitting and receiving the control communication signal.

Compared with the prior art, the present application has the advantage that: by placing the air purification system on both sides of the outdoor street, controlling the fan to transmit the outdoor air from the air inlet to the housing through the controller, controlling the electrostatic dust removal air purifier to purify the outdoor air, and after the air purification is completed, discharging the purified air from the air outlet through the fan, the purification of the outdoor air is realized, to solve the technical problem due to the poor air circulation of the street canyons, the difficulty in diffusing pollutants, and the inability to reduce the pollution on both sides of the street.

DESCRIPTION OF THE DRAWINGS

One or more embodiments are illustrated by the figures of the accompanying drawings, which are not to be construed as limiting the embodiments, and in which elements having the same reference numerals are represented as similar elements, unless specifically stated otherwise, the figures of the accompanying drawings are not to be construed as limiting the scale.

In the figures: 100. An air purification system; 10. A housing; 101. An air inlet; 102. An air outlet; 1021. A rotary nozzle; 103. A mounting port; 20. An electrostatic dust removal air purifier; 30. A first sealing door; 40. A second sealing door; 50. A solar photovoltaic panel; 200. An Internet of things artificial intelligence control device.

DETAILED DESCRIPTION OF THE EMBODIMENTS

In order to facilitate an understanding of the present application, reference will be made in more details to the accompanying drawings and the embodiments hereunder. It should be noted that, when an element is expressed to be "fixed to" another element, it may be directly on another element, or there may be one or more intervening elements therebetween. When an element is expressed to be "connected to" another element, it may be directly connected to another element, or there may be one or more intervening elements therebetween. As used in this specification, the terms "vertical," "horizontal," "left," "right," and the like are used for purposes of illustration only.

Unless defined otherwise, all technical and scientific terms used in this specification have the same meaning as commonly understood by those of ordinary skill in the art to which this application belongs. The terms used in the specification of the present application are for the purpose of describing specific embodiments only and is not intended to limit the present application. As used herein, the term "and/or" includes any and all combinations of one or more of the relevant listed items.

Figure 1:
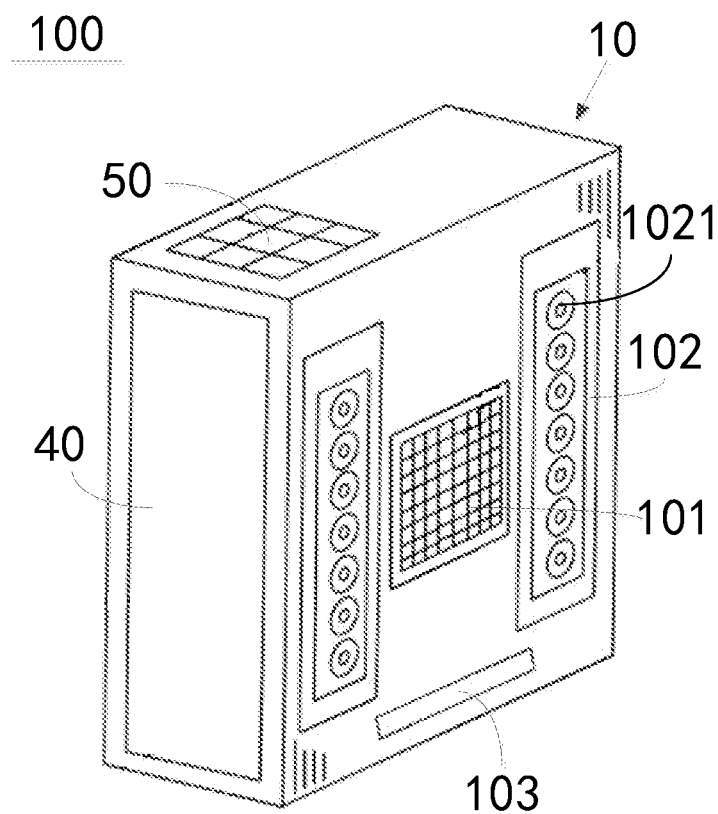
FIG. 1 is a schematic structural diagram of an air purification device according to an embodiment of the present application.
Figure 2:
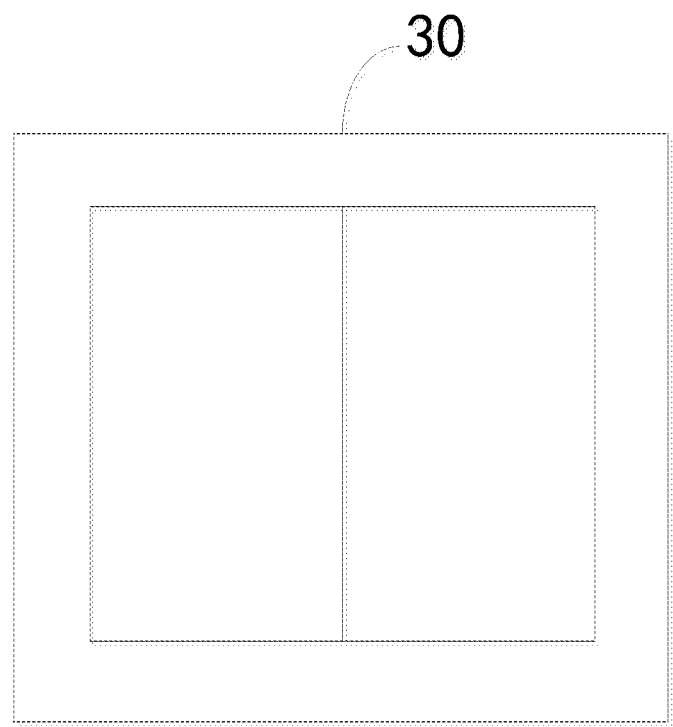
FIG. 2 is a schematic structural diagram of a first sealing door according to an embodiment of the present application.
Figure 3:
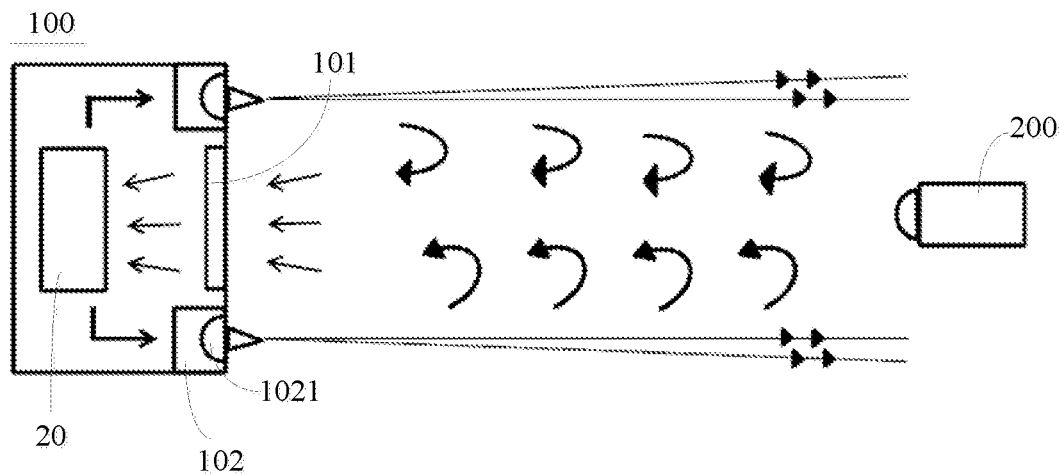
FIG. 3 is a schematic diagram of an operation state of an air inlet and an air outlet according to an embodiment of the present application.

Referring to FIGS. 1, 2 and 3, FIG. 1 is a schematic structural diagram of an air purification device according to an embodiment of the present application; FIG. 2 is a schematic structural diagram of a first sealing door according to an embodiment of the present application; FIG. 3 is a schematic diagram of an operation state of an air inlet and an air outlet according to an embodiment of the present application; An air purification system 100 is applied to both sides of an outdoor street and an associated space, comprising: a housing 10, an electrostatic dust removal air purifier 20, a controller (not shown), and a fan (not shown); The said electrostatic dust removal air purifier 20, the controller, and the fan are all disposed in the housing 10, herein the said controller is respectively connected to the said electrostatic dust removal air purifier 20 and the fan.

Understandably, the above-described air purification system 100 may be disposed with a plurality, distributing on both sides of the said outdoor street.

Figure 4:
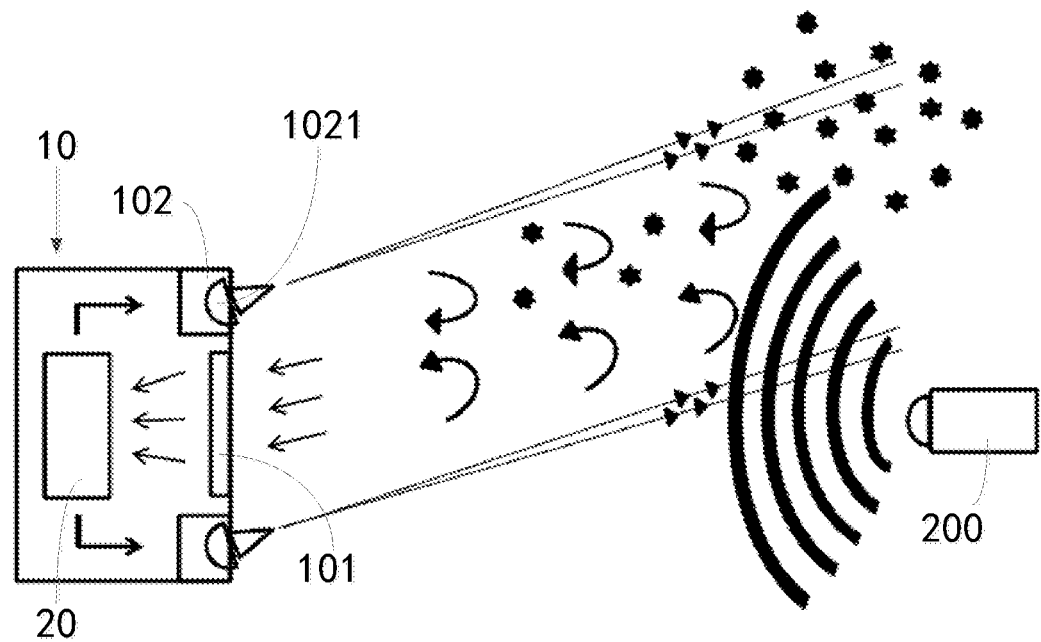
FIG. 4 is a schematic diagram of an operation state of another air inlet and another air outlet according to an embodiment of the present application.

Referring to FIG. 4, the housing 10 is configured in a square shape, and the front side of the said housing 10 is configured with an air inlet 101 and an air outlet 102, both of which are disposed on the side surface of the said housing 10 and on the same side, herein the said air inlet 101 is for transmitting outdoor polluted air, and the said air outlet 102 is for transmitting purified air.

The above-described air inlet 101 is configured in a square shape, and it is understood that the above-described housing 10 is further configured with a front filter screen (not shown), herein the said front filter screen is disposed at the said air inlet 101 for filtering the outdoor air.

Understandably, in order to better filter the dust entrained by the outdoor air, the pore size of the said front filter screen may be set according to the environment, and in this embodiment the pore size of the front filter screen is 0.3-1 microns.

Understandably, in some embodiments, the above-described air inlet 101 may further be configured in other shapes as long as air transmission is able to be achieved.

The above-described air outlet 102 is configured in a square shape and is disposed adjacent to the air inlet 101, herein the air outlet 102 is configured with at least one. In this embodiment, the air outlet 102 is configured with two, and the two said air outlets 102 are disposed on both sides of the said air inlet 101.

The side surface of the above-described housing 10 is further configured with a mounting port 103, herein the said mounting port 103 is disposed on the side of the housing 10 and on the same side as the air inlet 101, and the mounting port 103 is disposed below the said air inlet 101 and the said air outlet 102.

In order to facilitate the cleaning of the dust in the air purification system 100, the said mounting port 103 is configured with a dust collecting tray (not shown), herein the said dust collecting tray is disposed at the lower end of the said electrostatic dust removal air purifier 20 for collecting the dust generated after the said electrostatic dust removal air purifier 20 purifies the air, and the dust is able to be collected together for recycling the useful dust material.

Understandably, in order to purify the air sucked into the air purification system 100 in the seriously polluted area, the above-described air inlet 101 and the air outlet 102 are respectively configured with a rotary nozzle 1021, herein the said rotary nozzle 1021 is connected to the said controller, which controls the rotary nozzle 1021 to rotate and may purify the air in different areas.

Understandably, the above-described housing 10 is further configured with a first sealing door 30 and a second sealing door 40, herein the said first sealing door 30 is disposed on the side of the said housing 10 facing away from the said air inlet 101, and the second sealing door 40 is disposed on the side of the said housing 10 adjacent to the said first sealing door 30, and the said first sealing door 30 and the said second sealing door 40 are configured to prevent rainwater from entering the said air purification system 100 when the said first sealing door 30 and the said second sealing door 40 are closed, besides, to facilitate opening the air purification system 100 for maintenance.

The said controller is configured to control the operation of the fan and the electrostatic dust removal air purifier 20, and is communicatively connected to an external device for corresponding operation according to a control communication signal transmitted from the external device, and is able to forward the situation of the said air purification system 100, that is, the related parameters, to a monitoring center by the controller.

Understandably, the said controller may be implemented using any suitable type of control chip or processor having a certain logic operation capability, such as a single chip microcomputer STM32F103ZET6.

The said fan is connected to the said controller for sucking the outdoor polluted air into the air purification system 100 through the air inlet 101 or discharging the purified air in the air purification system 100 to the outside through the air outlet 102, so as to purify the outdoor street air.

The said electrostatic dust removal air purifier 20 is connected to the above-described controller, herein the said electrostatic dust removal air purifier 20 is used to purify the air sucked into the air purifying system 100 through the air inlet 101 by the fan, the purified air is discharged through the air outlet 102, and the dust generated at the time of purification falls into the above-described dust collecting tray.

Understandably, for better air purification, the said housing 10 is further configured with a front air filter (not shown), herein the said front air filter is disposed adjacent to the said air inlet 101, and the said front air filter is connected to the said controller for pretreating outdoor air delivered by the said air inlet 101, primarily for larger particles, debris and the like in the outdoor air.

The said air purification system 100 further comprises: a power supply (not shown) and a solar photovoltaic panel 50, herein the said power supply is connected to the said controller, the fan and the electrostatic dust removal air purifier 20 for supplying power to the said controller, the fan and the electrostatic dust removal air purifier 20.

The power supply may be provided from a conventional urban power supply.

The said solar photovoltaic panel 50 is disposed at the top of the said housing 10, and the said solar photovoltaic panel 50 is connected to the said power supply for supplying power to the said power supply.

Understandably, the top end of the said housing 10 is further configured with an Internet of things artificial intelligence control device 200, herein the Internet of things artificial intelligence control device 200 is able to be used for detecting the outdoor air concentration distribution, the said Internet of things artificial intelligence control device 200 is used for receiving and transmitting the control communication signal, and the said Internet of things artificial intelligence control device 200 is communicatively connected to the said controller, which controls the air purification system 100 to operate after receiving the control communication signal.

Understandably, the above-described Internet of things artificial intelligence control device 200 may further be externally operated and may not be disposed at the top end of the housing, for example, in an outdoor street.

Understandably, the control communication signal further comprises a nozzle directing signal, herein the said nozzle directing signal is used for controlling the operation of the rotary nozzle 1021.

The control communication signal may be concentration values of PM2.5 of the air in different areas of the nearby outdoor street and the corresponding areas. If the controller detects that the concentration value of PM2.5 exceeds a set threshold value, the said Internet of things artificial intelligence control device 200 emits a nozzle directing signal, and the controller receives the nozzle directing signal to control the rotary nozzle 1021 to face the area of serious pollution, and sucks the air in the area into the air purification system 100 through the air inlet 101 by the fan for purification, after the purification is completed, the purified air is discharged to the area through the air outlet 102 in an ejection manner, wherein the above-described area may be a position coordinate.

Understandably, the above-described control communication signal may be from an area of an outdoor street, when the Internet of things artificial intelligence control device 200 detects an area in which outdoor street pollution is serious, the area is transmitted to the controller, after the controller receives the control communication signal, the controller controls the rotary nozzle 1021 to discharge purified air from the air outlet 102 to the area so as to reduce the pollution of the area, and controls the fan to introduce the polluted air entrained by the area into the said air inlet 101.

Understandably, in some embodiments, the above-described Internet of things artificial intelligent control device 200 may further be disposed on both sides of the street or at neighboring appropriate locations. It is understood that, each air purification system 100 corresponds to an Internet of things artificial intelligence control device 200, or a plurality of air purification systems 100 correspond to an Internet of things artificial intelligence control device 200. If a plurality of Internet of things artificial intelligence control devices 200 are configured, the same plurality of Internet of things artificial intelligence control devices 200 operate at the same time, so that a better function of purifying outdoor street air is able to be realized.

The present application has the advantage that: by placing the air purification system 100 on both sides of the outdoor street, controlling the fan to transmit the outdoor air from the air inlet 101 to the housing 10 through the controller, controlling the electrostatic dust removal air purifier 20 to purify the outdoor air, and after the air purification is completed, discharging the purified air from the air outlet 102 through the fan, the purification of the outdoor air is realized, to solve the technical problem due to the poor air circulation of the street canyons, the occurrence of different situations of pollutant concentration distribution, the difficulty in diffusing pollutants, and the inability to reduce the pollution on both sides of the street.

It should be noted that, preferred embodiments of the present application are set forth in the specification and the accompanying drawings of the present application, however, the present application may be implemented in many different forms and is not limited to the embodiments described in the present specification. These embodiments are not intended as additional limitations on the disclosure of the present application, and are intended for a thorough understanding of the disclosure of the present application. Furthermore, the above-described technical characteristics continue to be combined with each other to form various embodiments which are not listed above, and are considered to be within the scope of the specification of the present application; Further, modifications and alterations may be made to those of ordinary skill in the art in light of the foregoing description, and all such modifications and alterations are intended to fall within the scope of the appended claims.

What is claimed is:

1. An air purification system, applied to both sides of an outdoor street and an associated space, characterized in that, comprises: a housing, an electrostatic dust removal air purifier, a controller, and a fan;

The said electrostatic dust removal air purifier, the controller and the fan are all disposed in the housing;

an air inlet and an air outlet are both arranged on a front surface of the said housing, wherein the said air inlet is for transmitting outdoor polluted air, and the said air outlet is for transmitting purified air;

The said electrostatic dust removal air purifier and the said fan are both connected to the said controller;

The said controller controls the said fan to transmit outdoor air to the housing through the air inlet, and controls the electrostatic dust removal air purifier to purify the said outdoor air, after the air purification is completed, the purified air is discharged by the fan through the air outlet;

Wherein the said housing is configured with a front filter screen, and the said front filter screen is disposed at the said air inlet for filtering the outdoor air;

the said housing is further configured with a front air filter, and the said front air filter is disposed adjacent to the said air inlet and connected to the said controller for pretreating the outdoor air delivered from the said air inlet;

Wherein the top end of the said housing is further configured with an Internet of things artificial intelligence control device for detecting an air pollution concentration distribution in a nearby space and transmitting a control communication signal, the said controller is communicatively connected to the said Internet of things artificial intelligence control device, the said air outlet is configured with a rotary nozzle, the said rotary nozzle is connected to the said controller, and when the controller receives the said control communication signal, the controller controls and directs the operation of the said rotary nozzle to purify polluted air in the said space.

2. The air purification system according to claim 1, characterized in that, the said air inlet and the said air outlet are disposed on the same side of the housing.

3. The air purification system according to claim 2, characterized in that, the same side of the said housing as the said air inlet is configured with a mounting port, the said mounting port is configured with a dust collecting tray, the said dust collecting tray is disposed at the lower end of the said electrostatic dust removal air purifier, for collecting the dust generated when the said electrostatic dust removal air purifier purifies the air.

4. The air purification system according to claim 1, characterized in that, the said air purification system further comprises:

A power supply, connected to the said controller, the fan, and the electrostatic dust removal air purifier, for supplying power to the said controller, the fan, and the electrostatic dust removal air purifier.

5. The air purification system of claim 4, characterized in that, the said air purification system further comprises:

A solar photovoltaic panel, disposed at the top of the said housing, and the said solar photovoltaic panel is connected to the said power supply and operable to supply power to the said power supply.

6. The air purification system according to claim 1, characterized in that, the side of the said housing facing away from the said air inlet is configured with a first sealing door, and the side of the said housing adjacent to the said first sealing door is configured with a second sealing door, and the said first sealing door and the said second sealing door are used for the maintenance of the air purification system and are able to prevent rainwater from entering the said air purification device when closed.

* * * * *